April 27, 1954     E. SENNA     2,676,604
COMBINED CONTROL VALVE AND BLEEDER VALVE
Filed April 7, 1950

*Edward Senna*
INVENTOR

BY
ATTORNEY

Patented Apr. 27, 1954

2,676,604

UNITED STATES PATENT OFFICE 2,676,604

COMBINED CONTROL VALVE AND BLEEDER VALVE

Edward Senna, Spokane, Wash.

Application April 7, 1950, Serial No. 154,459

5 Claims. (Cl. 137—171)

This invention relates to a combined control valve and bleeder valve and it is one object of the invention to provide a valve which is particularly adapted for use in connection with a radiator consisting of a coiled pipe through which hot water or steam flows and serves as a heating medium, the valve serving to control flow of the heating fluid through the radiator pipe and also as a bleeder which is normally closed and is only opened in order to allow air to escape from the radiator pipe.

Another object of the invention is to provide a valve structure including a saddle or body adapted to be welded to the radiator pipe and carrying a main valve for controlling flow of the heating medium through the pipe and an auxiliary valve serving as a bleeder for escape of air from the radiator pipe.

Another object of the invention is to provide a valve structure wherein the main valve is rotatably carried by the saddle and passes into the radiator pipe through an opening formed therein, the saddle being formed with a groove or passage leading from the opening in the pipe and communicating with an auxiliary bleeder valve through which air escapes when the auxiliary valve is opened.

Another object of the invention is to provide a combined main valve and bleeder valve carrying a housing which is of such size that its upper end, which is closed by a removable cover, will be exposed at the upper surface of a concrete floor in which a radiator pipe is mounted and thus allow ready access to the valve for adjustment thereof.

Another object of the invention is to provide a combination valve which is of simple construction, easy to adjust and capable of being readily applied to a radiator pipe.

The invention is illustrated in the accompanying drawings wherein.

This improved combination control valve and bleeder valve is applied to a pipe 1 which is embedded in a concrete floor F. The pipe may be of any suitable diameter and will be understood to have interconnected sections spaced transversely from each other and extending back and forth across a room. Steam, hot water or some other fluid heating medium flows through the pipe and heat is radiated from the hot pipe to heat the concrete and thus cause the room to be heated from a hidden source. This eliminates use of radiators or equivalent devices which are unsightly and often in the way. While it has been stated that the pipe is positioned in a floor for heating a room, it will be understood that it may be employed for heating a side walk, driveway, or a street-crossing or other portion of a street or road.

Figure 5:
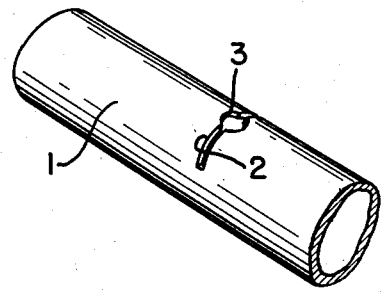
Fig. 5 is a perspective view of a portion of the radiator pipe to which the improved valve is to be applied.
Figure 4:
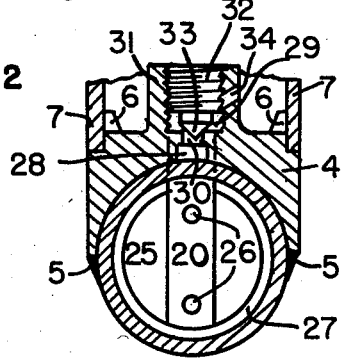
Fig. 4 is a transverse sectional view taken along the line 4—4 of Figure 2.

In such a system air will at times accumulate and prevent proper heating of the pipe and it is also necessary to control flow of the heating fluid through the pipe so that the fluid will flow through the pipe at the correct speed for efficient heating of the pipe. In order to control flow of steam or hot water through the pipe I have provided a valve which is mounted upon the pipe and is of such construction that it may serve as a bleeder valve as well as for controlling flow of the heating medium through the pipe. In order that the valve may be applied to the pipe a transversely extending kerf 2 is formed in the upper portion of the pipe at any desired point intermediate the length of the pipe and midway the length of this kerf an opening 3 is drilled of such diameter that it projects from opposite sides of the kerf, as shown in Figure 5.

Figure 1:
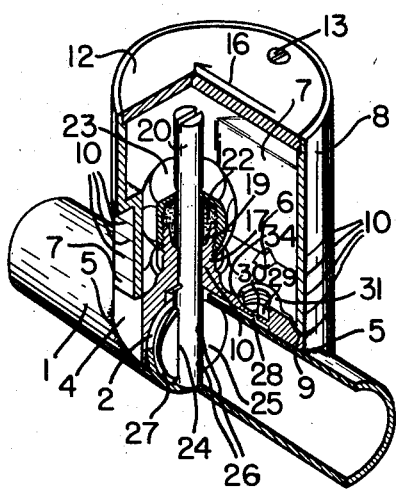
Fig. 1 is a perspective view showing a portion of a radiator pipe and the improved combination valve partially in section.
Figure 3:
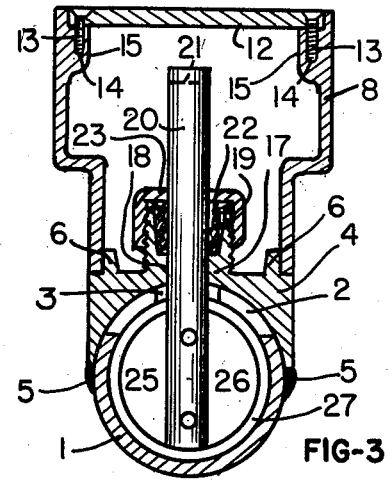
Fig. 3 is a transverse sectional view taken along the line 3—3 of Figure 2.
Figure 2:
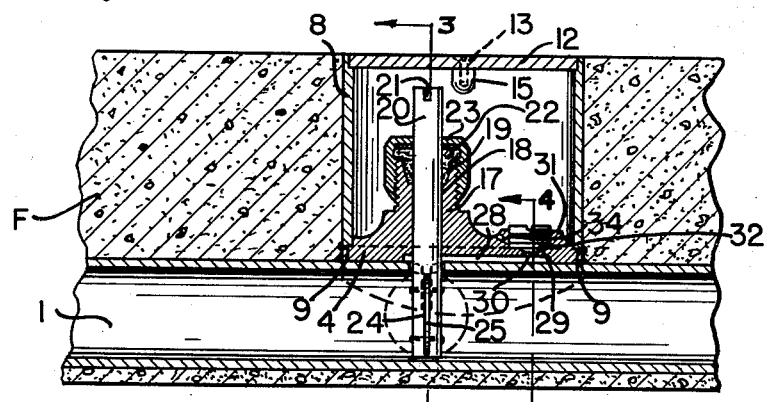
Fig. 2 is a sectional view taken longitudinally of the radiator pipe and the valve.

The combination valve is mounted upon the pipe and has a base or saddle 4 which is formed of cast metal and is of such length that it extends longitudinally of the pipe, as shown in Figures 1 and 2. The under surface of the saddle is concave and has its walls arcuate transversely so that the saddle straddles the pipe, as shown in Figure 3, when applied to the pipe, edges of the saddle being rigidly secured to the pipe by welding 5. The upper face of the saddle is flat and near its side edges are upstanding lugs 6 for engaging flat side wall portions 7 of a shell or housing 8 which is open at its top and bottom rests upon the saddle with its end portions engaged in grooves 9 formed in the saddle. Grooves or lines 10 are formed externally of the front and rear portions of the housing in vertical spaced relation to each other and serve as guide lines along which the housing may be cut and thus cause the housing to have a predetermined height which will cause its upper end to be flush with the surface of the concrete slab or floor 2. About the open upper end or top of the housing is formed an internal ledge upon which rests a removable cover 12 which is detachably secured by screws 13 passed through openings in the cover and screwed into sockets 14 formed in inwardly thickened portions or bosses 15 of the housing. When the cover is removed access may be had to mechanism within the housing. It will be understood that if the valve is applied to a heating pipe which is exposed instead of being embedded in concrete use of the housing is not necessary and it may be omitted. The upper surface of the cover has marked thereon an arrow 16 for indicating the direction in which the heating fluid flows through the pipe 1.

A boss or neck 17 extends upwardly from the base or saddle near one end thereof and through this neck is formed a bore 18 which extends downwardly from a pocket 19 formed in the upper portion of the boss and at its lower end registers with the opening 3 formed in the pipe. A stem 20 of a main valve is rotatably mounted through the bore 18 with its upper portion projecting upwardly from the pocket and formed at its upper end with a diametrically extending groove or eye 21 into which a screw driver may be fitted to turn the stem when adjustment of the main valve is necessary. The pocket is filled with packing 22 and upon the boss is screwed a cap nut or gland 23 which compresses the packing about the stem and forms a leak-proof joint. The lower portion of the stem projects downwardly from the saddle and passes through the openings 3 into the pipe, and this lower portion of the stem is formed with a longitudinally extending slot 24 in which a valve plate or disc 25 is fitted and secured by rivets 26. The metal from which the plate or disc 25 is formed is of such thickness that this valve plate may be passed through the slot or kerf 2 into the pipe and the diameter of the disc is such that when it is within the pipe its peripheral edge will be spaced from walls of the pipe and thus provide space 27 through which steam or water may flow when the stem is turned to a position disposing the disc in a closed position transversely of the pipe. Therefore when the main valve is closed the heating fluid may flow slowly through the pipe and cause a maximum heating of the pipe. By turning the stem in a direction to move the disc towards a fully opened position in which it extends longitudinally of the pipe the speed at which the fluid flows through the pipe will be increased and heating of the pipe correspondingly increased.

In case air accumulates in the pipe this air should be allowed to escape and thus clear the pipe of air which would interfere with proper heating of the pipe. In order to do so there has been provided an auxiliary valve which may be referred to as a bleeder valve and normally prevents flow of air or heating fluid through a groove or passage 28 formed in the under face of the saddle and extending longitudinally thereof from the lower end of the bore 18. This groove or passage registers with the opening 3 and its outer end is connected with the lower end of a socket 29 by a port 30. The socket is formed vertically in a boss 31 extending upwardly from the saddle adjacent the opposite end thereof from the boss 17 and into the socket is screwed a plug 32 having at its lower end a needle valve 33. When the plug is screwed downwardly in the socket to a closed position it blocks an outlet opening 34 formed through a side portion of the boss and the needle valve engages in the upper portion of the port 30 and closes this opening. Therefore when the auxiliary valve is closed air and heating fluid will be prevented from escaping, but when the plug 32 is turned in an opening direction the side opening 34 and the port 30 will be cleared and air may escape, the auxiliary valve being again closed when steam or hot water is discharged from the side opening. It will thus be seen that I have developed valve which may be readily applied to a heating pipe in a desired location and serve as a main valve for controlling flow of a heating fluid through the pipe and also as an auxiliary valve for normally preventing escape of fluid through a bleeder passage.

Having thus described the invention, what is claimed is:

1. In a concrete floor, a circulating pipe for a heating medium, said pipe being formed intermediate its length with a transversely extending kerf and with an opening midway the length of the kerf, a saddle over said pipe having a concaved transversely arcuate under face resting upon and rigidly secured to said pipe in straddling relation thereto, said saddle being formed with an upstanding boss externally threaded and formed with a pocket leading from its upper end and with a bore extending downwardly from the pocket and registering with the opening in the pipe, the under face of said saddle being formed with a groove extending from the bore towards one end of the saddle and in spaced relation to the said end of the saddle communicating with a port leading from the bottom of a socket open at its top and formed with a side opening constituting an outlet, a rotatable stem extending vertically through the pocket and the registering bore and the opening into said pipe and formed with a transverse slot leading from its lower end, a valve plate rigidly mounted in the slot of said stem and projecting from opposite sides thereof and of a diameter spacing its marginal edge from the inner surface of the pipe, packing in the pocket about said stem, a gland nut screwed upon said boss and comprising said packing about the stem and a needle valve screwed into said socket for closing the port and the side opening thereof.

2. A circulating pipe for a heating medium formed with a transverse kerf and with an opening midway the length of the kerf, a saddle mounted upon said pipe and formed with a pocket and with a bore extending downwardly from the pocket and registering with the opening in the pipe, a rotatable stem extending vertically through the pocket and the registering bore and opening into said pipe, a circular valve plate carried by the lower portion of said stem within the pipe and projecting from opposite sides thereof and of a diameter providing space between its marginal edge and the walls of the pipe when the plate is disposed transversely of the pipe, packing in said pocket, a gland nut compressing the packing about the stem, said saddle being formed with a passage leading from said bore and communicating with a port surrounded by a socket having a side opening constituting an outlet, and a plug screwed into said socket and formed at its inner end with a needle valve closing the port when the plug is in closing relation to the side opening.

3. A circulating pipe for a fluid heating medium formed with a transverse kerf and with an opening intermediate the length thereof, a saddle mounted upon said pipe and formed with a base registering with said opening, a rotatable stem mounted through the registering bore and opening and carrying a diametrically disposed valve plate passed inwardly through the kerf into said pipe and being of a diameter disposing its marginal edge in spaced relation to walls of the pipe, said saddle being formed with a groove leading from the bore to a discharge port, a socket surrounding said discharge port and formed with a side opening, a plug screwed into said socket and closing the side opening when tightened, and a needle valve at the inner end of said plug closing the discharge port when the plug is tightened.

4. A circulating pipe for a fluid heating medium formed with a transverse kerf and with an opening intermediate the length thereof, a saddle mounted upon said pipe and formed with a bore registering with said opening, a rotatable stem mounted through the registering bore and opening and carrying a diametrically disposed valve plate passed inwardly through the kerf into said pipe and being of a diameter disposing its marginal edge in spaced relation to walls of the pipe, said saddle being formed with a passage leading from the bore and the opening in the pipe to a discharge port, and a valve movable into and out of closing relation to the discharge port.

5. A circulating pipe for a fluid heating medium formed with a transverse kerf and with an opening intermediate the length thereof, a saddle mounted upon said pipe and formed with a bore registering with said opening, a rotatable stem mounted through the registering bore and opening and carrying a diametrically disposed valve plate passed inwardly through the kerf into said pipe and being of a diameter disposing its marginal edge in spaced relation to walls of the pipe, said saddle being formed with a valve-controlled passage communicating with the bore and the opening in the pipe.

References Cited in the file of this patent
UNITED STATES PATENTS

| Number | Name | Date |
|---|---|---|
| 817,287 | Washburne | Apr. 10, 1906 |
| 1,955,661 | Waldo | Apr. 17, 1934 |
| 2,444,942 | Miller | July 13, 1948 |

FOREIGN PATENTS

| Number | Country | Date |
|---|---|---|
| 613 | Great Britain | of 1878 |
| 11,766 | Great Britain | of 1884 |